US006435784B2

(12) United States Patent
De Mattia et al.

(10) Patent No.: US 6,435,784 B2
(45) Date of Patent: Aug. 20, 2002

(54) METHOD AND DEVICE FOR THE SURFACE MACHINING OF A STRUCTURE SUCH AS A CELLULAR STRUCTURE

(75) Inventors: Denis De Mattia, Basse Goulaine; Bernard-Albert Colin, Nantes, both of (FR)

(73) Assignee: EADS Airbus SA (FR)

( * ) Notice: Subject to any disclaimer, the term of this patent is extended or adjusted under 35 U.S.C. 154(b) by 22 days.

(21) Appl. No.: 09/738,886

(22) Filed: Dec. 18, 2000

(30) Foreign Application Priority Data

Dec. 27, 1999 (FR) ............................................. 99 16530

(51) Int. Cl.$^7$ .................................................. B23C 3/00
(52) U.S. Cl. ........................... 409/132; 83/875; 408/79; 409/175; 409/180; 409/184; 409/201; 409/237
(58) Field of Search .................. 409/131, 132, 409/175, 178, 180, 184, 201, 202, 204, 206, 211, 218, 237; 408/77, 78, 79; 83/54, 579, 875

(56) References Cited

U.S. PATENT DOCUMENTS

| 3,264,128 A |   | 8/1966  | Argueso, Jr. et al. |
| 3,413,708 A | * | 12/1968 | Norville et al. ............... 156/80 |
| 3,709,094 A | * | 1/1973  | Laux ....................... 144/119.1 |
| 4,614,466 A | * | 9/1986  | Snyder ....................... 409/179 |
| 4,677,886 A |   | 7/1987  | Neu |
| 4,689,920 A | * | 9/1987  | Geise ......................... 409/175 |
| 4,749,150 A |   | 6/1988  | Rose et al. |
| 4,907,920 A | * | 3/1990  | Lund et al. ..................... 407/2 |
| 5,145,297 A | * | 9/1992  | McGrath, Jr. ................ 15/1.51 |
| 5,543,198 A |   | 8/1996  | Wilson |
| 6,109,843 A | * | 8/2000  | Descoteaux .............. 29/402.02 |

FOREIGN PATENT DOCUMENTS

| EP |         | 0064573 | 11/1982 |           |
| GB |         | 1353468 | 5/1974  |           |
| JP |         | 77404 A | * 5/1983 | ........ 409/132 |

OTHER PUBLICATIONS

Random House College Dictionary, 1980, pp. 117, 118.*

* cited by examiner

Primary Examiner—Daniel W. Howell
(74) Attorney, Agent, or Firm—Thelen Reid & Priest; Robert E. Krebs

(57) ABSTRACT

In order to make notches in partitions separating substantially aligned recesses issuing onto the surface of a structure (10), use is made of a machining head (26) having a cutting tool (28) and at least one rotary member (52) adjacent to said tool. The rotary member (52) is provided with protuberances (54) supported in recesses of a row of recesses adjacent to that which is being machined, during the displacement of the machining head (26). The latter is connected with slackness to a tool holder by a mechanism, a lateral and height positioning of the tool (28) being ensured during machining.

16 Claims, 3 Drawing Sheets

METHOD AND DEVICE FOR THE SURFACE MACHINING OF A STRUCTURE SUCH AS A CELLULAR STRUCTURE

DESCRIPTION

1. Technical Field

The invention relates to a method and a device for the surface machining of a structure such as a cellular structure having at least one row of substantially aligned and regularly spaced recesses issuing onto the surface to be machined.

More specifically, the invention relates to a method and device for machining such a structure in accordance with a trajectory strictly parallel to one or more rows of recesses issuing onto the surface, over a random depth less than the thickness of the structure and from said surface.

A preferred application of the invention relates to the surface machining of a board or plate of a cellular material having tubular cells such as a honeycomb material, prior to the placing of sealing panels or skins on the two faces of the plate in order to form a sandwich panel usable more particularly in the aeronautical industry.

2. Prior Art

In a certain number of industries, such as the aeronautical industry, structural elements are frequently produced in the form of sandwich panels, which may or may not be planar. Such panels are in particular characterized by a high rigidity or stiffness and a relatively low weight.

Sandwich panels frequently comprise a core formed from a cellular material having tubular cells and on either side of which are connected, generally by bonding two skins.

For various reasons (reducing weight, increasing the life, improving the performance characteristics of structures produced with these materials, safety, etc.), it can be of interest to interconnect the different recesses delimited by the cells. Thus, when the cellular material having tubular cells is integrated into a sandwich panel, it becomes possible to drain liquids which may enter the recesses under certain conditions or balance the pressure of the air contained in the recesses if the external pressure is modified.

In order to implement these interconnections, it is known to produce notches in the walls separating adjacent recesses, prior to covering said recesses with the skin placed on the surface of the structure. GB-A-1 353 468, U.S. Pat. Nos. 4,749,150 and 5,543,198 reveal the interest of such notches, which can be of varied shapes and sizes. However, they fail to disclose any means for solving the manufacturing problems which will now be described.

In general terms, cellular materials having tubular cells are provided with recesses in rows juxtaposed in accordance with a regular pattern. In the most frequent case, the materials are said to be honeycomb materials and the recesses have a hexagonal cross-section. The walls of the recesses are usually of aluminium or of an organic or inorganic, composite material.

When it is wished to link the recesses of a cellular material by machining notches on the surface thereof, it must be ensured that the notches are correctly positioned and have controlled shapes and sizes in order to avoid negative effects on the products. This means that each notch must only link two adjacent recesses and must not extend to the junctions separating several recesses.

However, in practice, the plates of cellular materials having tubular cells are not regular and suffer from arbitrary defects linked with their manufacture (defective stacking of the sheets, deformations during expansion, undulations of the recesses, etc.).

As the material is not held by the addition of skins to its two faces, it has a limited inherent rigidity and consequently easily deforms when stresses are applied to its surface.

Bearing in mind the limited rigidity of cellular materials and the irregular nature of their networks of recesses, the production of notches solely in the parts of the walls separating two adjacent recesses gives rise to problems which are difficult to solve in practice.

Thus, if notches are machined by machines such as conventional biaxial milling machines ensuring the relative displacement of the cutting tool and the cellular material plate in accordance with the two axes of the plane of said plate, it is not possible to ensure a precise positioning of the notches in the walls of the recesses. In particular, the deformation of the material and the defects of the network of recesses are such that certain of the notches are then made at undesired points of the structure such as the junctions separating several recesses or walls which are machined over at least part of their length. This is seriously prejudicial to the mechanical performance characteristics of the sandwich panel produced with the thus machined material.

At present, no device is known permitting the machining of notches on the surface of such a structure whilst ensuring a sufficiently precise positioning of the notches relative to the rows of recesses, in order to reliably ensure that certain of the notches are not produced at undesired locations liable to prejudice the mechanical performance characteristics of the product obtained.

DESCRIPTION OF THE INVENTION

In general terms, the invention relates to a method for the surface machining of a structure having at least one row of substantially aligned and regularly spaced recesses issuing onto said surface, in accordance with a trajectory perfectly parallel to the row of recesses, no matter what the alignment defects of said recesses and no matter what the deformations undergone by the structure during machining.

According to the invention, this result is obtained by means of a method for machining a structure having at least one row of substantially aligned and regularly spaced recesses issuing onto the surface to be machined, characterized in that machining takes place by a relative displacement between a machining head and the structure to be machined, whilst being successively supported in at least some of the recesses of said row of recesses, so as to machine the surface in accordance with a trajectory parallel to said row.

According to a preferred embodiment of the invention use is made of a machining head incorporating at least one rotary member provided on its periphery with protuberances able to be successively supported in at least certain of the recesses during said relative displacement.

Advantageously, the rotary member is then applied to the surface of the structure with a substantially constant and predetermined force. Said force is chosen as a function of the nature of the machined structure, in order to avoid the deformation thereof, particularly by crushing, whilst ensuring a good penetration of the protuberances into the recesses.

As a function of the particular case, use is made either of a rotary member, which rotates freely on itself during said relative displacement, or a motor-driven rotary member, which drives the machining head in order to create said relative displacement.

When the rotary member is not motor-driven, an overall, relative displacement takes place between a tool holder and the structure to be machined, in accordance with a mean, rectilinear direction close to said trajectory and the machining head is mounted on the tool holder with an adequate slackness in the direction substantially perpendicular to the trajectory so as to ensure that said head follows the aforementioned trajectory whilst being supported in the recesses.

Advantageously bearing takes place on at least two rows of recesses on either side of a cutting tool carried by the machining head.

A preferred application of the method relates to the surface machining of a cellular material plate.

The invention also relates to a device for the surface machining of a structure having at least one row of substantially aligned and regularly spaced recesses issuing onto the surface to be machined, characterized in that it comprises a machining head and guidance means carried by the machining head and able to successively bear in at least some of the recesses of said recess row, during a relative displacement between the machining head and the structure to be machined, so as to machine the surface in accordance with a trajectory parallel to said row of recesses.

BRIEF DESCRIPTION OF THE DRAWINGS

The invention is described in greater detail hereinafter relative to a non-limitative and preferred embodiment and with reference to the attached drawings, wherein show.

DETAILED DESCRIPTION OF A PREFERRED EMBODIMENT OF THE INVENTION

Figure 1:
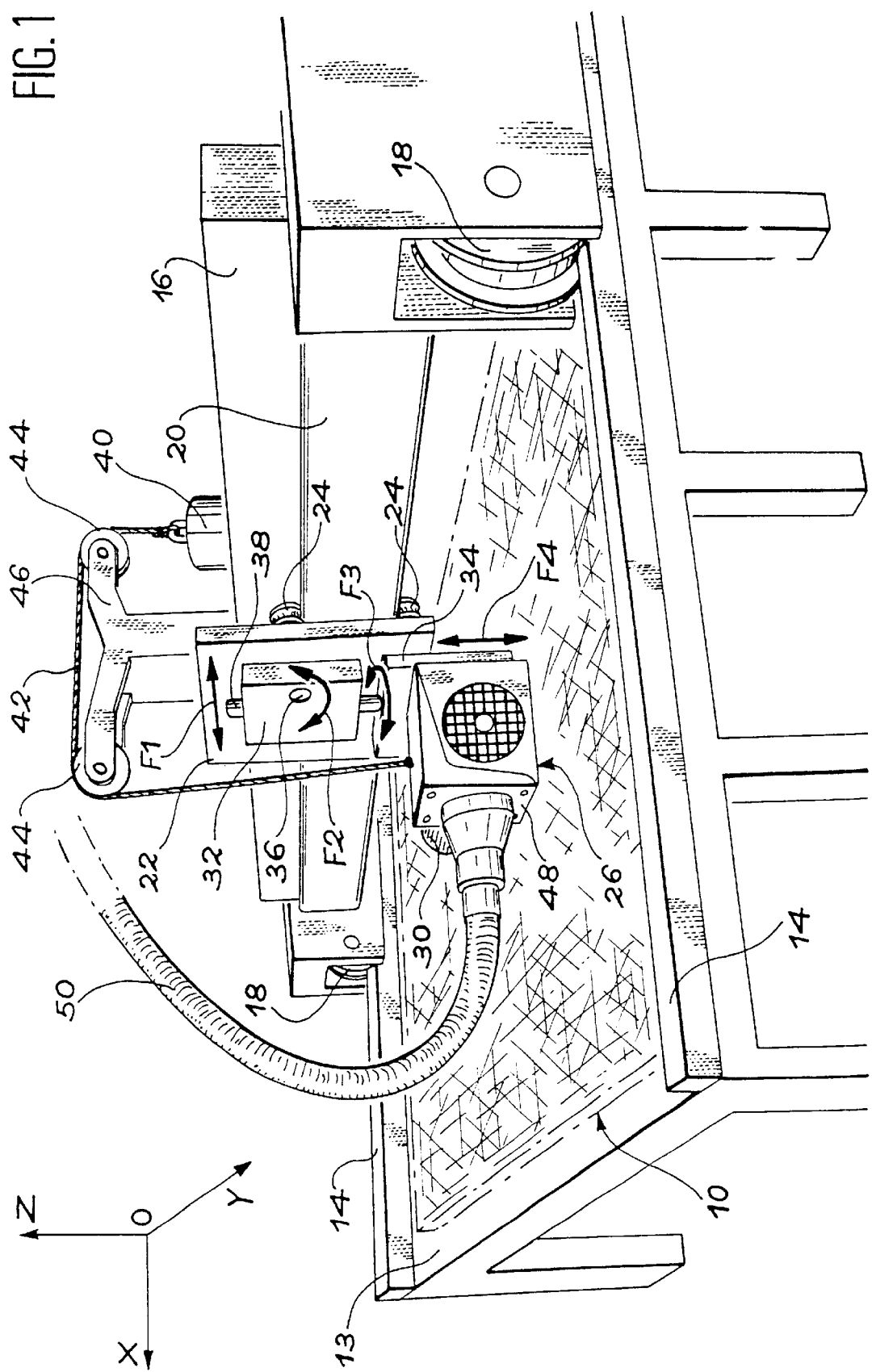
FIG. 1 A perspective view of a preferred embodiment of a machining device according to the invention.

FIG. 1 is an overall view of a surface machining device according to the invention. In the embodiment shown, said device is used for the surface machining of a structure 10 in the form of a planar board or plate of a honeycomb cellular material. As can best be gathered from FIG. 3, in known manner said material has cells or recesses 11 arranged in parallel rows in accordance with a hexagonal grid or system. These recesses are separated by partitions 12.

It should be noted that the invention is not limited to the machining of such a structure and instead is applicable in general terms to the machining of all planar or non-planar structures having at least one row of substantially aligned, regularly spaced recesses issuing onto the surface to be machined. In particular, any type of cellular structure having tubular cells can be machined according to the invention using a device derived from that which will now be described.

In the embodiment illustrated in FIG. 1, the machining device comprises a fixed table 13 serving to receive the structure 10 to be machined on its upper face. The positioning of the structure 10 on the table 13 is ensured in such a way that the surface to be machined of the structure 10 is turned upwards.

On either side of its upper face on which rests the structure 10, the table 13 has two rails 14 oriented parallel to one another in a first direction OX, which is parallel to the upper face of the table 13.

A beam or gantry 16 rests on each of the two rails 14 by means of runners 18. The beam 16 is oriented parallel to the upper face of the table 13 in accordance with a second direction OY orthogonal to the first direction OX defined by the rails 14. This arrangement enables the beam 16 to move along the rails 14 in the first direction OX above the structure 10 to be machined. This displacement is advantageously controlled by a not shown, motor-driven member, which can be controlled by a not shown robot.

On one of its lateral faces, the beam 16 is provided with a rail 20 oriented according to the second direction. The rail 20 supports a tool holder 22 by means of rollers 24. This arrangement enables the tool holder 22 to move from one end to the other of the beam 16 and consequently over the entire width of the table 13 in the second direction OY. This displacement is illustrated by arrow F1 in FIG. 1. Not shown control means are advantageously provided for controlling a displacement of the tool holder 22 from one end to the other of the beam 16 under the action of the aforementioned, not shown robot.

The tool holder 22 supports a machining head 26 equipped with a cutting tool 28 (FIG. 2), whereof the profile is adapted to the size and shape of the notches, e.g. a circular saw having triangular teeth. This cutting tool 28 is rotated by a motor 30 about an axis oriented substantially in accordance with the second direction OY.

According to a first aspect of the invention, the machining head 26 is connected to the tool holder 22 by means of a mechanism allowing a limited displacement between these two subassemblies, at least in the lateral and height directions with respect to the trajectory followed by the tool holder 22 during the actual machining operation. This mechanism enables the machining head 26 to follow the displacement of the tool holder 22 in the first direction OX, whilst permitting it to have a certain freedom both in the second direction OY and in a vertical direction OZ orthogonal to the first and second directions OX and OY.

In the embodiment illustrated in exemplified manner in FIG. 1, said relative freedom between the machining head 26 and the tool holder 22 is obtained by connecting said two members by means of a mechanism comprising a first support 32 and a second support 34.

More specifically, the first support 32 is mounted on the tool holder 22 by means of a spindle 36 oriented in accordance with the first direction OX, i.e. parallel to the rails 14. Thus, the first support 32 moves with the beam 16 and with the tool holder 22 in the first direction OX, which also constitutes the advance direction of the cutting tool 28, whilst being able to pivot about the spindle 36, in one or other direction, as illustrated by the arrow F2.

The second support 34 is connected to the first support 32 by a spindle 38 orthogonal to the spindle 36 and substantially oriented in accordance with the vertical axis OZ. More specifically, this connection permits a rotation of the second support 34 about the spindle 38, illustrated by the arrow F3.

Finally, the machining head 26 is mounted on the second support 34 by a linear guidance device, which allows a translation of said head with respect to the second support 34 parallel to the spindle 38 and as illustrated by arrow F4.

Not shown blocking means make it possible to block the pivoting movements about the spindles 36 and 38 in a neutral position, in which these spindles are respectively oriented in accordance with the directions OX and OY. A not shown, lifting control system makes it possible to raise the machining head 26 from the surface to be machined, when the device is stationary.

The arrangement described hereinbefore is such that the machining head 26 normally rests by gravity on the upper surface to be machined of the structure 10. When the beam 16, carrying the machining head 26, is moved along rails 14 in order to ensure the machining of notches E (FIG. 3) in partitions 12 of structure 10, level variations of the upper surface thereof are automatically taken into account by a displacement of the machining head 26 relative to the second support 34 parallel to the spindle 38, in accordance with the arrow F4. It is therefore certain that the machining depth remains constant no matter what the shape of the surface to be machined.

The pivoting of the first support 32 about the spindle 36 (arrow F2) combined with the pivoting of the second support 34 about the spindle 38 (arrow F3) enable the cutting tool 28 to follow a trajectory not perfectly parallel to the first direction OX defined by the rails 14.

Advantageously, the machining head 26 is applied to the surface to be machined of the structure 10 with a substantially constant and predetermined force. This force is chosen as a function of the nature of the structure to be machined in order not to damage it, whilst still ensuring an adequate pressure to ensure the desired machining depth in all circumstances.

If the weight of the machining head 26 is inadequate for applying the thus defined, predetermined force, it is possible to weight the machining head. Elastic means can also be interposed between the tool holder 22 and the machining head.

In the embodiment shown, it is assumed that the weight of the machining head 26 would lead to the application of an excessive force to the structure 10 to be machined. In this case, a counterweight 40 can be used for relieving the force due to the weight of the machining head 26, as illustrated in FIG. 1. Said counterweight 40 is then connected to the machining head 26 by a cable 42 passing over pulleys 44 installed on a mast 46 integral with the tool holder 22, so as to apply an upwardly oriented force on the machining head.

Figure 2:
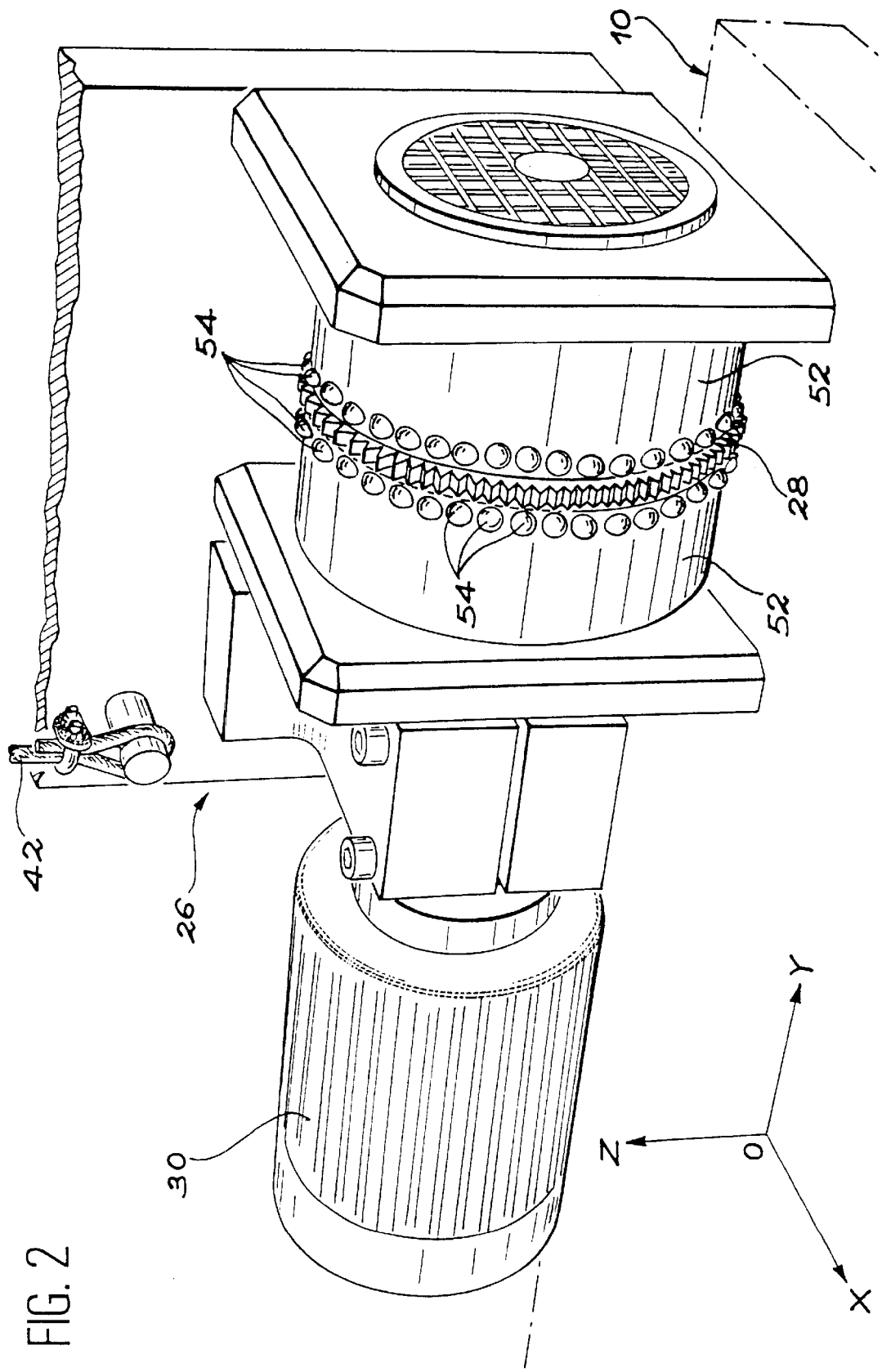
FIG. 2 A perspective view showing in greater detail the machining head of the device of FIG. 1.

As shown in FIG. 1, the machining head 26 preferably has a fairing 48 to which is connected a tube 50 linked with not shown means for the suction of chips produced by the cutting tool 28 during its operation. In FIG. 2 said fairing has been removed to make it possible to see the parts of the machining head close to the cutting tool 28 and which will now be described.

According to the invention, at least on one side of the cutting tool 28 and preferably on either side thereof in the manner shown in FIG. 2, the machining head 26 has a rotary member 52.

In the embodiment shown, each of the rotary members 52 is constituted by a guide wheel flush with the corresponding face of the milling cutter forming the cutting tool 28. The guide wheels 52 are mounted in the machining head 26 so as to rotate freely about the same axis. Said axis is parallel to the axis of tool 28 or coincides therewith, as in the case of FIGS. 2 and 3. Conversely any other significant relative displacement between the wheels 52 and tool 28 is impossible. This means that the tool 28 and guide wheels 52 move in unison when the machining head 26 is displaced relative to the tool holder 22, taking advantage of the freedom brought about by the connecting mechanism placed between these members.

The relative arrangement between the guide wheels 52 and cutting tool 28 is such that the lower generatrix of the wheels 52 is located above the lower generatrix of the tool 28 at a distance equal to the depth of the notches E (FIG. 3) to be machined. Thus, when the machining head 26 rests on the structure 10 to be machined, the guide wheels bear on the upper surface thereof. The cutting tool 28 is then embedded in the partitions 12 over a height corresponding to the depth of the notches E.

Figure 3:
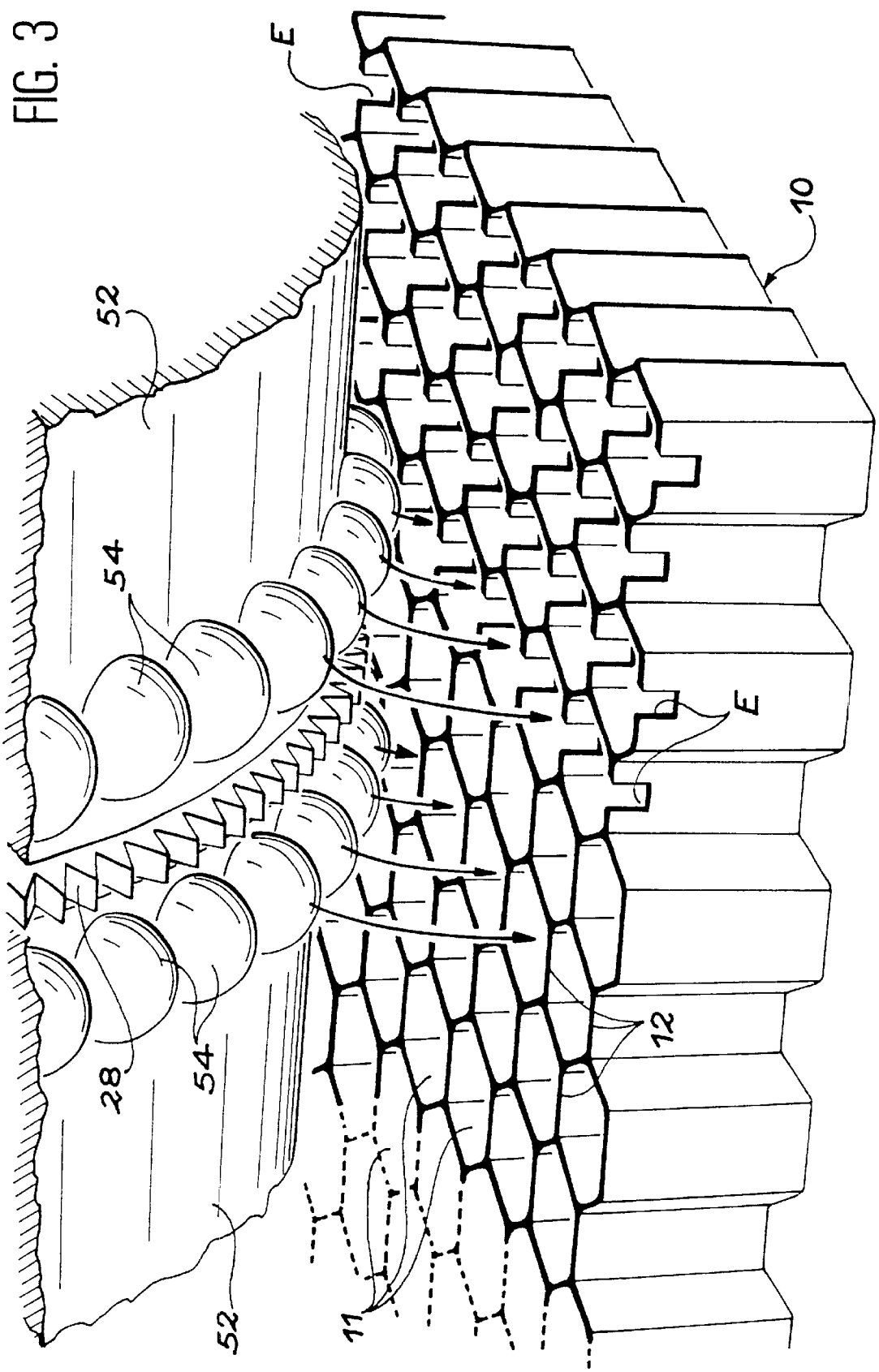
FIG. 3 A perspective view illustrating the cooperation of the protuberances equipping two rotary members carried by the machining head with two rows of recesses of the structure to be machined, in the device illustrated by FIGS. 1 and 2.

As can be seen in FIGS. 2 and 3, in the immediate vicinity of the cutting tool 28, each of the wheels 52 is peripherally provided with regularly spaced protuberances 54. The dimensions, shape and spacing of the protuberances 54 are chosen as a function of the structure 10 to be machined, so that each of the protuberances can penetrate the end of one of the recesses 11 formed in the structure 10.

During the machining of notches E in the partitions 12 separating the recesses of a row of recesses 11 formed in the structure 10, in accordance with a direction substantially parallel to the first direction OX, the beam 16 moves on the rails 14 in accordance with the direction OX. The beam 16 drives therewith the machining head 26 by means of the tool holder 22 and the connecting mechanism with clearance linking said two members. The protuberances 54 of the guide wheels 52 are then successively supported in the recesses 11 of the two recess rows contiguous to the recess row, whose partitions 12 are being machined.

As a result of the cooperation of the protuberances 54 with the recesses 11, the instantaneous trajectory followed by the cutting tool 28 precisely corresponds to that of the recess row, whose partitions are being machined. This brings about a very precise height and lateral positioning of the tool as a result of the fact that the machining head 26 has certain degrees of freedom with respect to the tool holder 22, as has been stated hereinbefore. Consequently no matter what the defects of the structure to be machined and possible deformations undergone by it during machining, the method and device according to the invention make it possible to be sure that the notches E are machined precisely at the desired locations and have the desired depth. Thus, all the notches can be made in the centre of the partitions 12 separating successive recesses of the same row in the manner illustrated in FIG. 3. This guarantees the mechanical performance characteristics of the finished part.

The machining pass change takes place by blocking the displacements of the tool holder 22 in the lateral direction OY with respect to the advance direction OX of the tool 28. At the end of each pass, when the machining head 26 is still resting on the surface of the structure 10 to be machined, the degree of lateral freedom OY of the machining head is locked. The machining head is then raised sufficiently to completely free the protuberances 54 and the cutting tool 28 from the structure 10 to be machined. There is then a lateral displacement of the tool holder 22 in direction OY over a distance corresponding to an integral number of steps separating juxtaposed recess rows 11 in said direction. This displacement is generally by one step when all the rows of cells have to be machined and a single cutting tool 28 is used. The machining head 26 then rests on the surface of the structure, the degree of freedom in the lateral direction OY is freed and a new machining pass in the longitudinal direction (in the reverse sense) OX is carried out.

Obviously all these operations can be handled by a robot, particularly when an entire surface of the structure 10 has to be machined.

There can be numerous variants to the embodiment described hereinbefore with reference to FIGS. 1 to 3 without passing outside the scope of the invention. Thus, the cutting tool can be guided by a single rotary member instead of two such members. The protuberances equipping each rotary member can also be arranged so as to only penetrate every other recess in the same row, when the recesses are very close together. Moreover, instead of being constituted by a wheel, each rotary member can e.g. also be constituted by a caterpillar system carrying protuberances.

Instead of being mounted on a beam guided by rails, the machining head can be carried by an articulated arm or any equivalent system. The machining head can also be mounted on a portable system directly manipulated by an operator, whose manual guidance then ensures the lateral and height displacements imposed by the cooperation of the protuberances and the recesses. In this case, it is also possible to replace the freely rotating rotary member or members by one or more motor-driven rotary members, which then control the advance of the device.

Finally, the machining procedure according to the invention is applicable both to the machining of a planar structure and to the machining of a structure having a convex or concave surface. Although the recesses are generally formed by the cells of a cellular material having tubular cells, there can also be recesses of a different nature, which do not necessarily traverse the entire structure.

It should also be noted that the shape and depth of the notch machined with the aid of the device according to the invention can be of a random nature and are solely dependent on the chosen cutting tool. Thus, instead of being in the form of a circular saw, whose axis coincides with or is parallel to that of the rotary member carrying the protuberances, as in the embodiment described, the cutting tool can be constituted by a drill or the like, whose rotation axis is then orthogonal to that of the rotary member and is oriented perpendicular to the surface of the structure to be machined. It is also possible to simultaneously machine several notches making use of several juxtaposed machining tools.

What is claimed is:

1. Method for machining a structure having at least one row of substantially aligned and regularly spaced recesses issuing onto the surface to be machined, wherein machining takes place by a relative displacement between a machining head and the structure to be machined, bearing successively in at least some of the recesses of said row of recesses, so as to machine the surface in accordance with a trajectory parallel to said row.

2. Method according to claim 1, wherein use is made of a machining head having at least one rotary member provided on its periphery with protuberances able to successively bear in at least some of the recesses during said relative displacement.

3. Method according to claim 2, wherein said rotary member is applied to the surface of the structure with a substantially constant and predetermined force.

4. Method according to claim 2, wherein use is made of a rotary member, which rotates freely on itself during said relative displacement.

5. Method according to claim 2, wherein use is made of a motor-driven rotary member, which drives the machining head in order to create said relative displacement.

6. Method according to claim 1, wherein there is an overall relative displacement between a tool holder and the structure to be machined, in accordance with a rectilinear, mean direction close to the said trajectory and the machining head is mounted on the tool holder with an adequate slackness in a direction substantially perpendicular to the trajectory to ensure that said head follows said trajectory being supported in the recesses.

7. Method according to claim 1, wherein bearing takes place on at least two rows of recesses located on either side of a cutting tool carried by the machining head.

8. Method according to claim 1, applied to the surface machining of a cellular material plate.

9. Device for the surface machining of a structure having at least one row of substantially aligned and regularly spaced recesses issuing onto the surface to be machined, said device comprising a machining head and guidance means carried by the machining head and which can be successively supported in at least some of the recesses of said row of recesses, during a relative displacement between the machining head and the structure to be machined, so as to machine the surface in accordance with a trajectory parallel to said row of recesses.

10. Device according to claim 9, wherein the guidance means comprise at least one rotary member peripherally provided with protuberances able to successively bear in at least some of the recesses during said relative displacement.

11. Device according to claim 10, wherein means are provided for applying the rotary member to the surface to be machined with a substantially constant and predetermined force.

12. Device according to claim 11, wherein said application means comprise a counterweight.

13. Device according to claim 10, wherein the rotary member is mounted in the tool holder so as to be able to rotate freely on itself.

14. Device according to claim 10, wherein the rotary member can be rotated by motor-driven means.

15. Device according to claim 9, also comprising a tool holder, means for displacing the tool holder in a rectilinear, mean direction close to said trajectory and a linking mechanism with clearance by which the machining head is mounted on the tool holder.

16. Device according to claim 10, wherein said guidance means can bear on at least two rows of recesses located on either side of a cutting tool carried by the machining head.

* * * * *